US011592616B2

(12) United States Patent
Munige et al.

(10) Patent No.: US 11,592,616 B2
(45) Date of Patent: Feb. 28, 2023

(54) UNIVERSAL OPTICAL FIBRE WITH SUPER GAUSSIAN PROFILE

(71) Applicant: Sterlite Technologies Limited, Gurgaon (IN)

(72) Inventors: Srinivas Munige, Gurugram (IN); Apeksha Malviya, Gurugram (IN); Anand Pandey, Gurugram (IN)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/316,717

(22) Filed: May 11, 2021

(65) Prior Publication Data

US 2022/0003922 A1   Jan. 6, 2022

(51) Int. Cl.
*G02B 6/028* (2006.01)
*G02B 6/036* (2006.01)
*G02B 6/02* (2006.01)

(52) U.S. Cl.
CPC ....... *G02B 6/0281* (2013.01); *G02B 6/02395* (2013.01); *G02B 6/036* (2013.01); *G02B 6/0286* (2013.01); *G02B 6/0365* (2013.01); *G02B 6/03627* (2013.01)

(58) Field of Classification Search
None
See application file for complete search history.

(56) References Cited

U.S. PATENT DOCUMENTS

2013/0044987 A1* 2/2013 Bickham ............. G02B 6/0281
385/123
2021/0208335 A1* 7/2021 Abedijaberi ......... G02B 6/0288

* cited by examiner

*Primary Examiner* — Michelle R Connelly
(74) *Attorney, Agent, or Firm* — Steven R. Fairchild; Michael J. Pennington

(57) ABSTRACT

The present disclosure provides an optical fibre (100). The optical fibre (100) includes a glass core region (102). The glass core region (102) has a core relative refractive index profile. The core relative refractive index profile is a super Gaussian profile. In addition, the optical fibre (100) includes a glass cladding region (108) over the glass core region (102). The optical fibre (100) has at least one of a mode field diameter in a range of 8.7 micrometers to 9.7 micrometers at wavelength of 1310 nanometers and an attenuation up to 0.18 dB/km. The optical fibre (100) has at least one of macro-bend loss up to 0.5 decibel per turn corresponding to wavelength of 1550 nanometer at bending radius of 7.5 millimeter. The optical fibre (100) has a macro-bend loss up to 1.0 decibel per turn corresponding to wavelength of 1625 nanometer at bending radius of 7.5 millimeter.

8 Claims, 3 Drawing Sheets

UNIVERSAL OPTICAL FIBRE WITH SUPER GAUSSIAN PROFILE

TECHNICAL FIELD

The present disclosure relates to the field of optical fibre transmission. More particularly, the present disclosure relates to a bend insensitive optical fibre with large mode field diameter. The present application is based on, and claims priority from an Indian Application Number 202011004899 filed on 3 Jul. 2020, the disclosure of which is hereby incorporated by reference herein.

BACKGROUND

With the advancement of science and technology, various modern technologies are being employed for communication purposes. One of the most important modern communication technologies is optical fibre communication technology using a variety of optical fibres. Optical fibre is used to transmit information as light pulses from one end to another. One such type of optical fibre is a single mode optical fibre. The single mode optical fibre is used in FTTx and long haul communication. The telecommunication industry is continuously striving for designs to achieve high data rate capacity and low losses. The ongoing research suggests that the single mode optical fibre of G657 and G652D category are used for FTTx and long-haul applications respectively. The single mode optical fibre of G652D and G657 categories faces major challenges in FTTx and long haul communication respectively. G652D fibres faces major challenges in FTTx application due to high macro bend losses and G657 category fibres face major challenges in long haul applications due to high nonlinear effects as a result of low MFD. Also, low MFD in G657A2 in long haul communication results in a power penalty more than 1.5 decibel as compare to G652D.

The significantly matured G652.D category fibres have already taken millions of kms in current FTTX infrastructure. The one advantage that G652D category fibres have, is its ultra-splicing capabilities but average macro-bending characteristics. To address the need to enhance the macro-bending, the G657A2 and G657A1 optical fibres have been developed and evolved. The replacement of G652.D fibres with G657.A2 or G657.A1 can be a solution. However, G657.A2 or G657 A1 has their own issues when it comes to splicing capabilities. There is always a need to develop an optical fibre that exhibits the property of both G657A2 and G657D so as to achieve flexible splicing capability as well as good macro bend performance i.e. easy splicing of G.657.A2/A1 with G.652.D. It is usually noticed that there is a persisting problem of using G.657.A2 fibres, because of OTDR artifacts that occur when splicing them to standard single mode fibres i.e. G.652D.

There always seems to be a need to develop an optical fibre which would have an optimize design with good macro-bend characteristics, as well as is also compliant to current network installed G.652.D. For example, G657A2 has a mode field diameter is the range as same as mode field diameter as that of G.652.D.

In light of the above stated discussion, there is a need for a single mode optical fibre that overcomes the above sited drawbacks to use for FTTx as well as long haul and access networks.

OBJECT OF THE DISCLOSURE

A primary object of the present disclosure is to provide a bend insensitive optical fibre.

SUMMARY

In an aspect, the present disclosure provides an optical fibre. The optical fibre includes a glass core region and a glass cladding region. The glass core region has a core relative refractive index profile. The core relative refractive index profile is a super Gaussian profile. In addition, the glass cladding region is positioned over the glass core region. The optical fibre has at least one of a mode field diameter in a range of 8.7 micrometers to 9.7 micrometers at wavelength of 1310 nanometers and an attenuation up to 0.18 dB/km. The optical fibre has at least one of macro-bend loss up to 0.5 decibel per turn corresponding to wavelength of 1550 nanometer at bending radius of 7.5 millimeter. The optical fibre has a macro-bend loss up to 1.0 decibel per turn corresponding to wavelength of 1625 nanometer at bending radius of 7.5 millimeter.

The optical fibre may have at least one of a zero dispersion wavelength in a range of 1300 nanometer to 1324 nanometer and a cable cut off wavelength of up to 1260 nanometer.

The optical fibre may include a buffer region before the glass cladding region. The optical fibre may include the buffer region between the glass core region and the glass cladding region. The buffer region may have one or more of a thickness of 3 micrometers to 4 micrometers and a buffer relative refractive index $\Delta_2$ in range of −0.01 to 0.01.

The glass core region may have at least one of a core rescale factor (a) in a range of 4 micrometers to 4.5 micrometers, a core gamma γ between 6 to 9, a core relative refractive index $\Delta_1$ in range of 0.30 to 0.37 and a core thickness in range of 9 micrometers to 14 micrometers.

The optical fibre may include a trench region. The trench region may have at least one of a trench relative refractive index $\Delta_3$ in range of about −0.33 to −0.24, trench thickness in range of 6 micrometers to 9 micrometers and a trench curve parameter α in a range of 4 to 8.

The glass cladding region may have a clad relative refractive index $\Delta_4$ in range of −0.01 to 0.01 and a clad thickness in range of 35.5 to 44.5.

The optical fibre may splice with standard single mode fibre such that the optical fibre is compatible with a G652.D category installed optical fibres and G657.A1 category optical fibre.

STATEMENT OF THE DISCLOSURE

In an aspect, the present disclosure provides an optical fibre. The optical fibre includes a glass core region and a glass cladding region. The glass core region has a core relative refractive index profile. The core relative refractive index profile is a super Gaussian profile. In addition, the glass cladding region is positioned over the glass core region. The optical fibre has at least one of a mode field diameter in a range of 8.7 micrometers to 9.7 micrometers at wavelength of 1310 nanometers and an attenuation up to 0.18 dB/km. The optical fibre has at least one of macro-bend loss up to 0.5 decibel per turn corresponding to wavelength of 1550 nanometer at bending radius of 7.5 millimeter. The optical fibre has a macro-bend loss up to 1.0 decibel per turn corresponding to wavelength of 1625 nanometer at bending radius of 7.5 millimeter.

BRIEF DESCRIPTION OF FIGURES

Figure 1:
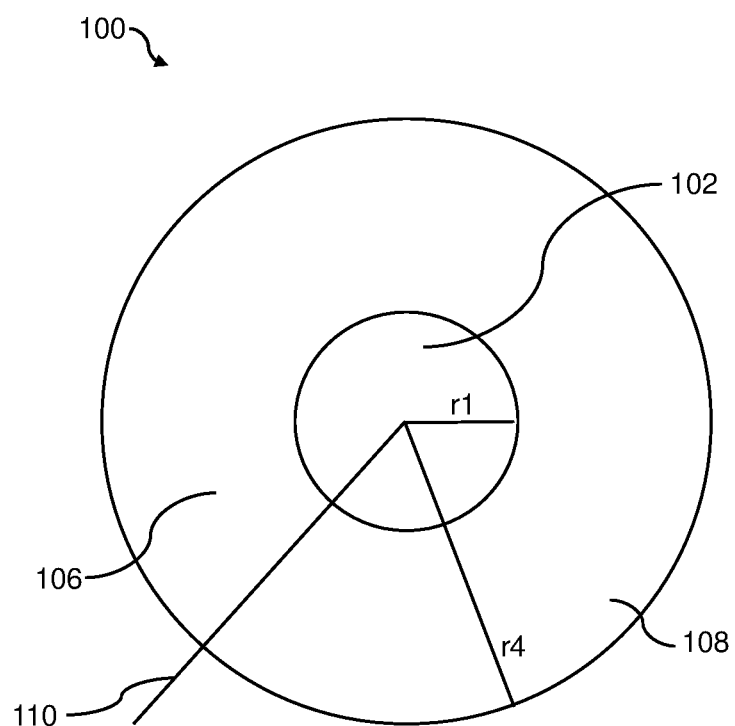
Figure 2:
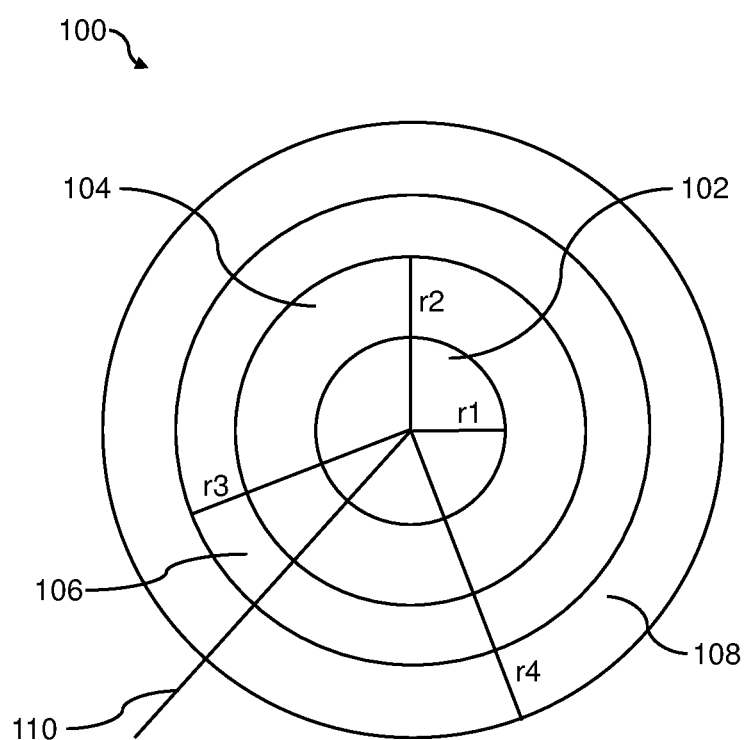
Figure 3:
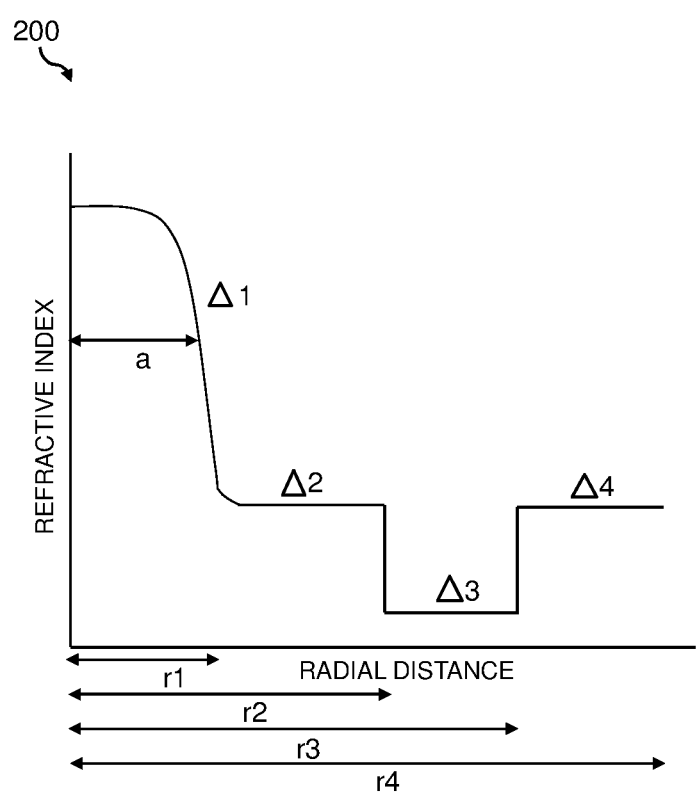

Having thus described the disclosure in general terms, reference will now be made to the accompanying figures, wherein:

FIG. 1 illustrates a cross-sectional view of an optical fibre;

FIG. 2 illustrates a cross-sectional view of the optical fibre of FIG. 1 with a buffer region; and FIG. 3 illustrates a refractive index profile of the optical fibre.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross-sectional view of an optical fibre 100. FIG. 2 illustrates a cross-sectional view of the optical fibre of FIG. 1 with a buffer region. In general, optical fibre is a thin strand of glass or plastic capable of transmitting optical signals. The optical fibre 100 is configured to transmit information over long distances with relatively low attenuation and low bending loss. In addition, the optical fibre 100 has high data transmission rate. Further, the optical fibre 100 is utilized for spatial division multiplexing applications. In general, spatial division multiplexing is a method to access channels by creating parallel spatial channel next to higher capacity channel.

The optical fibre 100 includes a glass core region 102 and a glass cladding region 108. The optical fibre 100 may include a buffer region 104 and a trench region 106. In general, core is an inner part of an optical fibre and cladding is an outer part of the optical fibre. The glass core region 102 is defined along a central longitudinal axis 110 of the optical fibre 100. The central longitudinal axis 110 is an imaginary axis passing through center of the optical fibre 100.

Further, the glass core region 102, the buffer region 104, the trench region 106 and the glass cladding region 106 of the optical fibre 100 are associated with a refractive index profile. In general, the refractive index profile is maintained as per required level based on concentration of chemicals used for manufacturing of an optical fibre. In addition, the chemicals used for manufacturing of the optical fibre include one or more materials and one or more dopants. Further, the one or more materials such as, but not limited to, silica, fluorozirconate, fluoroaluminate, chalcogenide, crystalline materials and the one or more dopants such as, but not limited to, germanium dioxide (GeO2), aluminium oxide (Al2O3), fluorine or boron trioxide (B2O3) are deposited over surface of initial material with facilitation of flame hydrolysis. Furthermore, the initial material is a substrate rod or a tube.

The refractive index profile determines relationship between a refractive index of the optical fibre 100 and a radius of the optical fibre 100. In addition, the radius of the optical fibre 100 corresponds to a first radius $r_1$, a second radius $r_2$, a third radius $r_3$ and a fourth radius $r_4$. In addition, manufacturing of the optical fibre 100 is carried out after manufacturing of a preform. Further, the refractive index profile of the optical fibre 100 is determined during manufacturing of the preform of the optical fibre 100.

The optical fibre 100 includes a plurality of regions. In addition, each of the plurality of regions is defined by a corresponding relative refractive index, and a corresponding radius. In general, relative refractive index is defined as the measure of relative difference in refractive index between the two regions. The relative refractive index of each of the plurality of regions is different. The radius of each of the plurality of regions is different.

In addition, the relative refractive index profile of the glass core region 102 of the optical fibre 100 changes from the center of the optical fibre 100 to the radius of the glass core region 102. Further, the relative refractive index of each of the plurality of regions has a pre-defined value. Furthermore, the radius of each of the plurality of regions has a pre-defined value. Moreover, the pre-defined values of the relative refractive index are set to obtain low bending loss, and low attenuation.

The relative refractive index of each of the plurality of regions is fixed over a cross-sectional area of each region. In addition, the glass core region 102, the buffer region 104, the trench region 106, and the glass cladding region 108 are concentrically arranged. Further, the buffer region 104 surrounds the glass core region 102. Moreover, the trench region 106 surrounds the buffer region 104. Also, the glass core region 102, the buffer region 104, the trench region 106, and the glass cladding region 108 is associated with corresponding relative refractive index, and radius.

The glass core region 102 of the optical fibre 100 has a core relative refractive index $\Delta_1$. In addition, the glass core region 102 has maximum refractive index $n_{max}$. Further, the glass core region 102 is characterized by a core rescale factor (a) and a γ (gamma). Furthermore, the glass core region 102 of the optical fibre 100 has the first radius $r_1$. The first radius $r_1$ is in range of about 9 micrometers to 14 micrometers. Range of the first radius $r_1$ of the glass core region 102 may vary. The glass core region 102 may have the core relative refractive index $\Delta_1$ in range of about 0.30 to 0.37. Range of the core relative refractive index $\Delta_1$ may vary. The core rescale factor (a) may be in a range of about 4 micrometers to 4.5 micrometers. In addition, range of the core rescale factor (a) may vary. The γ (gamma) may be in a range of about 6 to 9. Range of the γ (gamma) may vary. The glass core region 102 may have a core thickness in range of 9 micrometers to 14 micrometers. The core thickness of the glass core region 102 may vary.

The expression used for calculating the relative refractive index is produced below:

$$\Delta i = \left(\frac{n_i^2 - n_{clad}^2}{2 \times n_i^2}\right)$$

where, $n_{clad}$: refractive index of the pure silica;

$n_i$: refractive index of the $i_{th}$ layer;

$\Delta i$: the relative refractive index of $i_{th}$ layer.

The refractive index profile changes between the first radius $r_1$ and the fourth radius $r_4$ of the optical fibre 100. Further, the relative refractive index of the glass core region 102, the glass cladding region 108, the buffer region 104 and the trench region 106 has a pre-defined value. Furthermore, the radius of the glass core region 102, the glass cladding region 108, the buffer region 104 and the trench region 106 has a pre-defined value. The pre-defined values of the relative refractive index are set to obtain good macro-bend performance and high mode field diameter.

The optical fibre 100 may include the buffer region 104 before the glass cladding region 108. The optical fibre 100 may include the buffer region 104 between the glass core region 102 and the glass cladding region 108. The buffer region 104 is defined by the first radius $r_1$ and the second radius $r_2$ from the central longitudinal axis 110 of the optical fibre 100. The buffer region 104 has a buffer relative refractive index $\Delta_2$. Further, the trench region 106 is defined by the second radius $r_2$ and the third radius $r_3$ from the central longitudinal axis 110 of the optical fibre 100. The trench region 106 may have a trench relative refractive index $\Delta_3$. Furthermore, the glass cladding region 108 is defined by the third radius $r_3$ and the fourth radius $r_4$. Moreover, the glass cladding region 108 has a clad relative refractive index $\Delta_4$.

The buffer region 104 of the optical fibre 100 has the second radius $r_2$ in range of about 12 micrometers to 18 micrometers. Range of the second radius $r_2$ may vary. The buffer region 104 may have one or more of a thickness of 3 micrometers to 4 micrometers and a buffer relative refractive index $\Delta_2$ in range of −0.01 to 0.01. The buffer relative refractive index $\Delta_2$ and the thickness of the buffer region 104 of the optical fibre 100 may vary.

The trench region 106 of the optical fibre 100 has the third radius $r_3$ in range of about 18 micrometers to 27 micrometers. In addition, range of the third radius $r_3$ may vary. The trench region 106 of the optical fibre 100 may have the trench relative refractive index $\Delta_3$ in range of about −0.33 to −0.24. Further, range of the trench relative refractive index $\Delta_3$ may vary. The trench region 106 may have a trench curve parameter $\alpha$ in range of about 4 to 8. Furthermore, value of the trench curve parameter $\alpha$ may vary. The trench region 106 may have a trench thickness in range of 6 micrometers to 9 micrometers. Moreover, value of the trench thickness may vary.

The glass cladding region 108 of the optical fibre 100 has the fourth radius $r_4$ in about 62.5 micrometers. In addition, value of the fourth radius $r_4$ may vary. The glass cladding region 108 may have the clad relative refractive index $\Delta_4$ in range of −0.01 to 0.01. The clad relative refractive index $\Delta_4$ of the glass cladding region 108 of the optical fibre 100 may vary. In addition, the glass cladding region 108 may have a clad thickness in range of 35.5 micrometers to 45.5 micrometers. The clad thickness of the glass cladding region 108 of the optical fibre 100 may vary.

The glass core region 102 of the optical fibre 100 has maximum refractive index $n_{max}$. In addition, the buffer region 104 has refractive index of pure silica $n_{clad}$. Further, minimum refractive index of the trench region 106 is $n_{trench}$. The glass core region 104 has a core relative refractive index profile. The core relative refractive index profile is a super Gaussian profile. The core relative refractive index profile is set to obtain a balance between desired macro-bend performance and high mode field diameter as optical fibre having high mode field diameter adversely impacts the macro bend performance.

Further, the expression used for super Gaussian profile for the glass core region 102 of the optical fibre 100 is as follow:

$$\Delta(r) = \Delta 1 * \exp\left(-\left(\frac{r}{a}\right)^\gamma\right)$$

for $r \leq r_1$ $\Delta(r) = \Delta 2$ for $r_1 \leq r < r_2$ $$n(r) = n_{clad} - n_{trench}\left[1 - 2\Delta 3\left(\frac{R3 - r}{R3 - R2}\right)^\alpha\right]^{0.5}$$

for $r_2 \leq r < r_3$ $\Delta(r) = \Delta 4$ for $r_3 \leq r < r_4$ where,

'r': radial position from center of the optical fibre 100;

'a': rescale factor;

'$\gamma$': gamma is a positive number.

FIG. 3 illustrates a refractive index profile 200 of the optical fibre 100. It may be noted that to explain a graphical appearance of the refractive index profile 200, references will be made to the structural elements of the optical fibre 100. The refractive index profile 200 illustrates a relationship among the relative refractive index of the optical fibre 100, and the radius of the optical fibre 100 (as stated above in the detailed description of the FIG. 1 and FIG. 2). The refractive index profile 200 shows the change in the relative refractive index of the optical fibre 100 with the radius of the optical fibre 100.

The optical fibre 100 has the mode field diameter in range of 8.7 micrometers to 9.7 micrometers at wavelength of 1310 nanometer. In addition, range of the mode field diameter of the optical fibre 100 may vary. In general, mode field diameter defines a section or area of optical fibre in which the optical signals travel. The optical fibre 100 has an attenuation up to 0.18 dB/km.

The optical fibre 100 may have at least one of a zero dispersion wavelength in a range of 1300 nanometer to 1324 nanometer and a cable cut off wavelength of up to 1260 nanometer. The cable cut off wavelength of the optical fibre 100 may vary. In addition, range of the zero dispersion wavelength of the optical fibre 100 may vary.

The optical fibre 100 is characterized by a macro-bend loss. In general, bending loss is a loss that occurs when optical fibre is bent. In addition, bending loss includes macro-bend loss and a micro-bend loss. The optical fibre 100 has at least one of macro-bend loss up to 0.5 decibel per turn corresponding to wavelength of 1550 nanometer at bending radius of 7.5 millimeter and a macro-bend loss up to 1.0 decibel per turn corresponding to wavelength of 1625 nanometer at bending radius of 7.5 millimeter.

In an example, the glass core region 102 may have the $\gamma$ (gamma) of about 5. In addition, the glass core region 102 may have the rescale factor (a) of about 4.4 micrometers. Further, the glass core region 102 has the first radius $r_1$ of about 10 micrometers. Furthermore, the core relative refractive index $\Delta_1$ has a value of about 0.33. Moreover, the buffer relative refractive index $\Delta_2$ has a value of about −0.01. Also, the buffer region 104 has the second radius $r_2$ of about 14 micrometers. Also, the trench curve parameter α has a value of about 6. Also, the trench region 106 has the third radius $r_3$ of about 21 micrometers. Also, the trench relative refractive index $\Delta_3$ has a value of about −0.31. Also, the glass cladding region 108 has the fourth radius $r_4$ of about 62.5 micrometers. Also, the clad relative refractive index $\Delta_4$ has a value of about 0.01. Also, the mode field diameter is about 9.23 micrometers at wavelength of 1310 nanometers. Also, the zero dispersion wavelength is about 1313 nanometer. Also, the cable cut off wavelength is about 1220 nanometer. Also, macro-bend loss of the optical fibre 100 is about 0.01 decibel per turn corresponding to wavelength of 1550 nanometer at bending radius of 7.5 millimeter. Also, macro-bend loss of the optical fibre 100 is about 0.03 decibel per turn corresponding to wavelength of 1625 nanometer at bending radius of 7.5 millimeter.

In another example, the glass core region 102 may have the γ (gamma) of about 8. In addition, the glass core region 102 has the rescale factor (a) of about 4.4 micrometers. Further, the glass core region 102 has the first radius $r_1$ of about 10 micrometers. Furthermore, the core relative refractive index $\Delta_1$ has a value of about 0.34. Moreover, the buffer relative refractive index $\Delta_2$ has a value of about 0. Also, the buffer region 104 has the second radius $r_2$ of about 14 micrometers. Also, the trench curve parameter α has a value of about 6. Also, the trench region 106 has the third radius $r_3$ of about 19 micrometers. Also, the trench relative refractive index $\Delta_3$ has a value of about −0.28. Also, the glass cladding region 108 has the fourth radius $r_4$ of about 62.5 micrometers. Also, the clad relative refractive index $\Delta_4$ has a value of about 0. Also, the mode field diameter is about 9.13 micrometers at wavelength of 1310 nanometers. Also, the zero dispersion wavelength is about 1313 nanometer. Also, the cable cut off wavelength is about 1205 nanometer. Also, macro-bend loss of the optical fibre 100 is about 0.16 decibel per turn corresponding to wavelength of 1550 nanometer at bending radius of 7.5 millimeter. Also, macro-bend loss of the optical fibre 100 is about 0.38 decibel per turn corresponding to wavelength of 1625 nanometer at bending radius of 7.5 millimeter.

In yet another example, the glass core region 102 may have the γ (gamma) of about 7. In addition, the glass core region 102 has the rescale factor (a) of about 4.45 micrometers. Further, the glass core region 102 has the first radius $r_1$ of about 12 micrometers. Furthermore, the core relative refractive index $\Delta_1$ has a value of about 0.34. Moreover, the buffer relative refractive index $\Delta_2$ has a value of about 0. Also, the buffer region 104 has the second radius $r_2$ of about 16 micrometers. Also, the trench curve parameter α has a value of about 6. Also, the trench region 106 has the third radius $r_3$ of about 20 micrometers. Also, the trench relative refractive index $\Delta_3$ has a value of about −0.31. Also, the glass cladding region 108 has the fourth radius $r_4$ of about 62.5 micrometers. Also, the clad relative refractive index $\Delta_4$ has a value of about 0. Also, the mode field diameter is about 9.13 micrometers at wavelength of 1310 nanometers. Also, the zero dispersion wavelength is about 1313 nanometer. Also, the cable cut off wavelength is about 1195 nanometer. Also, macro-bend loss of the optical fibre 100 is about 0.20 decibel per turn corresponding to wavelength of 1550 nanometer at bending radius of 7.5 millimeter. Also, macro-bend loss of the optical fibre 100 is about 0.49 decibel per turn corresponding to wavelength of 1625 nanometer at bending radius of 7.5 millimeter.

In yet another example, the glass core region 102 has the γ (gamma) of about 6. In addition, the glass core region 102 has the rescale factor (a) of about 4.4 micrometers. Further, the glass core region 102 has the first radius $r_1$ of about 10 micrometers. Furthermore, the core relative refractive index $\Delta_1$ has a value of about 0.34. Moreover, the buffer relative refractive index $\Delta_2$ has a value of about 0. Also, the buffer region 104 has the second radius $r_2$ of about 16 micrometers. Also, the trench curve parameter α has a value of about 8. Also, the trench region 106 has the third radius $r_3$ of about 20 micrometers. Also, the trench relative refractive index $\Delta_3$ has a value of about −0.31. Also, the glass cladding region 108 has the fourth radius $r_4$ of about 62.5 micrometers. Also, the clad relative refractive index $\Delta_4$ has a value of about 0. Also, the mode field diameter is about 9.18 micrometers at wavelength of 1310 nanometers. Also, the zero dispersion wavelength is about 1317 nanometer. Also, the cable cut off wavelength is about 1180 nanometer. Also, macro-bend loss of the optical fibre 100 is about 0.27 decibel per turn corresponding to wavelength of 1550 nanometer at bending radius of 7.5 millimeter. Also, macro-bend loss of the optical fibre 100 is about 0.59 decibel per turn corresponding to wavelength of 1625 nanometer at bending radius of 7.5 millimeter.

In yet another example, the glass core region 102 has the γ (gamma) of about 9. In addition, the glass core region 102 has the rescale factor (a) of about 4.15 micrometers. Further, the glass core region 102 has the first radius $r_1$ of about 12 micrometers. Furthermore, the core relative refractive index $\Delta_1$ has a value of about 0.33. Moreover, the buffer relative refractive index $\Delta_2$ has a value of about 0. Also, the buffer region 104 has the second radius $r_2$ of about 13 micrometers. Also, the trench curve parameter α has a value of about 5. Also, the trench region 106 has the third radius $r_3$ of about 20 micrometers. Also, the trench relative refractive index $\Delta_3$ has a value of about −0.25. Also, the glass cladding region 108 has the fourth radius $r_4$ of about 62.5 micrometers. Also, the clad relative refractive index $\Delta_4$ has a value of about 0. Also, the mode field diameter is about 9.08 micrometers at wavelength of 1310 nanometers. Also, the zero dispersion wavelength is about 1322 nanometer. Also, the cable cut off wavelength is about 1175 nanometer. Also, macro-bend loss of the optical fibre 100 is about 0.09 decibel per turn corresponding to wavelength of 1550 nanometer at bending radius of 7.5 millimeter. Also, macro-bend loss of the optical fibre 100 is about 0.18 decibel per turn corresponding to wavelength of 1625 nanometer at bending radius of 7.5 millimeter.

In yet another example, the glass core region 102 has the γ (gamma) of about 3. In addition, the glass core region 102 has the rescale factor (a) of about 4.2 micrometers. Further, the glass core region 102 has the first radius $r_1$ of about 13 micrometers. Furthermore, the core relative refractive index $\Delta_1$ has a value of about 0.36. Moreover, the buffer relative refractive index $\Delta_2$ has a value of about 0.01. Also, the buffer region 104 has the second radius $r_2$ of about 18 micrometers. Also, the trench curve parameter α has a value of about 4. Also, the trench region 106 has the third radius $r_3$ of about 25 micrometers. Also, the trench relative refractive index $\Delta_3$ has a value of about −0.31. Also, the glass cladding region 108 has the fourth radius $r_4$ of about 62.5 micrometers. Also, the clad relative refractive index $\Delta_4$ has a value of about −0.01. Also, the mode field diameter is about 9 micrometers at wavelength of 1310 nanometers. Also, the zero dispersion wavelength is about 1322 nanometer. Also, the cable cut off wavelength is about 1232 nanometer. Also, macro-bend loss of the optical fibre 100 is about 0.04 decibel per turn corresponding to wavelength of 1550 nanometer at bending radius of 7.5 millimeter. Also, macro-bend loss of the optical fibre 100 is about 0.10 decibel per turn corresponding to wavelength of 1625 nanometer at bending radius of 7.5 millimeter.

In yet another example, the glass core region 102 has the γ (gamma) of about 9. In addition, the glass core region 102 has the rescale factor (a) of about 4.1 micrometers. Further, the glass core region 102 has the first radius $r_1$ of about 11 micrometers. Furthermore, the core relative refractive index $\Delta_1$ has a value of about 0.33. Moreover, the buffer relative refractive index $\Delta_2$ has a value of about 0. Also, the buffer region 104 has the second radius $r_2$ of about 12 micrometers. Also, the trench curve parameter α has a value of about 5. Also, the trench region 106 has the third radius $r_3$ of about 22 micrometers. Also, the trench relative refractive index $\Delta_3$ has a value of about −0.25. Also, the glass cladding region 108 has the fourth radius $r_4$ of about 62.5 micrometers. Also, the clad relative refractive index $\Delta_4$ has a value of about 0. Also, the mode field diameter is about 9.12 micrometers at wavelength of 1310 nanometers. Also, the zero dispersion wavelength is about 1321 nanometer. Also, the cable cut off wavelength is about 1188 nanometer. Also, macro-bend loss of the optical fibre 100 is about 0.16 decibel per turn corresponding to wavelength of 1550 nanometer at bending radius of 7.5 millimeter. Also, macro-bend loss of the optical fibre 100 is about 0.38 decibel per turn corresponding to wavelength of 1625 nanometer at bending radius of 7.5 millimeter.

In yet another example, the glass core region 102 has the γ (gamma) of about 9. In addition, the glass core region 102 has the rescale factor (a) of about 4.2 micrometers. Further, the glass core region 102 has the first radius $r_1$ of about 10 micrometers. Furthermore, the core relative refractive index $\Delta_1$ has a value of about 0.31. Moreover, the buffer relative refractive index $\Delta_2$ has a value of about −0.01. Also, the buffer region 104 has the second radius $r_2$ of about 15 micrometers. Also, the trench curve parameter α has a value of about 5. Also, the trench region 106 has the third radius $r_3$ of about 22 micrometers. Also, the trench relative refractive index $\Delta_3$ has a value of about −0.25. Also, the glass cladding region 108 has the fourth radius $r_4$ of about 62.5 micrometers. Also, the clad relative refractive index $\Delta_4$ has a value of about 0. Also, the mode field diameter is about 9.3 micrometers at wavelength of 1310 nanometers. Also, the zero dispersion wavelength is about 1324 nanometer. Also, the cable cut off wavelength is about 1170 nanometer. Also, macro-bend loss of the optical fibre 100 is about 0.33 decibel per turn corresponding to wavelength of 1550 nanometer at bending radius of 7.5 millimeter. Also, macro-bend loss of the optical fibre 100 is about 0.72 decibel per turn corresponding to wavelength of 1625 nanometer at bending radius of 7.5 millimeter.

The optical fibre 100 has a core clad concentricity error of up to 0.5. The core clad concentricity error of the optical fibre 100 may vary. The optical fibre 100 has cladding non-circularity percentage of up to 0.7 percent. Cladding non-circularity percentage of the optical fibre 100 may vary. In addition, the optical fibre 100 may have a zero dispersion slope of up to 0.092 picosecond/(nanometer2.kilometer). The zero dispersion slope of the optical fibre 100 may vary. Further, the optical fibre 100 has a prof testing (kpsi) of at least 100 or more. The prof testing of the optical fibre 100 may vary. Furthermore, the optical fibre 100 has a coating strip force in between 1.3-5.0 Newton. The coating strip force may vary. Moreover, the optical fibre 100 has a fibre curl of at least 4 meters or more. The optical fibre 100 has coating cladding concentricity error of up to 12 micro meters. Also, coating cladding concentricity error may vary.

The optical fibre 100 is compliant with G657.A2 bend-insensitive fibre that splices seamlessly with standard single mode fibres. The optical fibre 100 that is compliant with G657.A2 bend insensitive fibre, has an optimized design with the same mode field diameter as standard G.652.D fibres to ensure full compatibility with a G.652.D installed optical fibre base. The optical fibre 100 enables next-level cable designs and bend performance, while streamlining field optical time domain reflectometer (OTDR) testing protocols. The optical fibre 100 has extreme bend performance of G.657A2 category optical fibre with the splicing convenience of a G.657.A1 design. The optical fibre 100 has a bend-insensitive property that assists in conserving optical power in closures and other locations where bending losses can quickly add up, further improving optical power margins.

The optical fibre 100 may splice with standard single mode fibre such that the optical fibre 100 is compatible with a G652.D category installed optical fibres and G657.A1 category optical fibre. The optical fibre 100 has low small angle scattering (low attenuation). The optical fibre 100 has high data transmission rate. The optical fibre 100 has an optimized Super Gaussian profile to support large mode filed diameter and enhanced macro-bend characteristics and performance.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. An optical fibre (100) comprising:
   a glass core region (102) having a core relative refractive index profile, wherein the core relative refractive index profile is a super Gaussian profile, wherein the glass core region (102) has a core gamma y between 6 to 9;
   a trench region (106), wherein the trench region (106) has a trench curve parameter α in a range of 4 to 8; and
   a glass cladding region (108) over the glass core region (102), wherein the optical fibre (100) has at least one of a mode field diameter in a range of 8.7 micrometers to 9.7 micrometers at a wavelength of 1310 nanometer and an attenuation up to 0.18 dB/km, wherein the optical fibre (100) has at least one of macro-bend loss up to 0.5 decibel per turn corresponding to wavelength of 1550 nanometer at bending radius of 7.5 millimeter, and macro-bend loss up to 1.0 decibel per turn corresponding to wavelength of 1625 nanometer at bending radius of 7.5 millimeter.

2. The optical fibre (100) as claimed in claim 1, wherein the optical fibre (100) has at least one of a zero dispersion wavelength in a range of 1300 nanometer to 1324 nanometer and a cable cut off wavelength of up to 1260 nanometer.

3. The optical fibre (100) as claimed in claim 1 further comprising a buffer region (104) before the glass cladding region (108).

4. The optical fibre (100) as claimed in claim 1 further comprising a buffer region (104) between the glass core region (102) and the glass cladding region (108), wherein the buffer region (104) has one or more of a thickness of 3 micrometers to 4 micrometers and a buffer relative refractive index $\Delta_2$ in range of −0.01 to 0.01.

5. The optical fibre (100) as claimed in claim 1, wherein the glass core region (102) has at least one of a core rescale factor (a) in a range of 4 micrometers to 4.5 micrometers, a core relative refractive index $\Delta_1$ in range of 0.30 to 0.37 and a core thickness of the glass core region (102) in range of 9 micrometers to 14 micrometers.

6. The optical fibre (100) as claimed in claim 1 further comprising a trench region (106), wherein the trench region (106) has at least one of a trench relative refractive index $\Delta_3$ in range of −0.33 to −0.24 and a trench thickness in range of 6 micrometers to 9 micrometers.

7. The optical fibre (100) as claimed in claim 1, wherein the glass cladding region (108) has a clad relative refractive index $\Delta_4$ in range of −0.01 to 0.01 and a clad thickness in range of 35.5 micrometers to 44.5 micrometers.

8. The optical fibre (100) as claimed in claim 1, wherein the optical fibre (100) splices with a standard single mode fibre such that the optical fibre (100) is compatible with a G652.D category installed optical fibre and a G657.A1 category optical fibre.

* * * * *